Aug. 13, 1963    G. L. WILDE    3,100,627
BY-PASS GAS-TURBINE ENGINE
Filed March 31, 1958    4 Sheets-Sheet 1
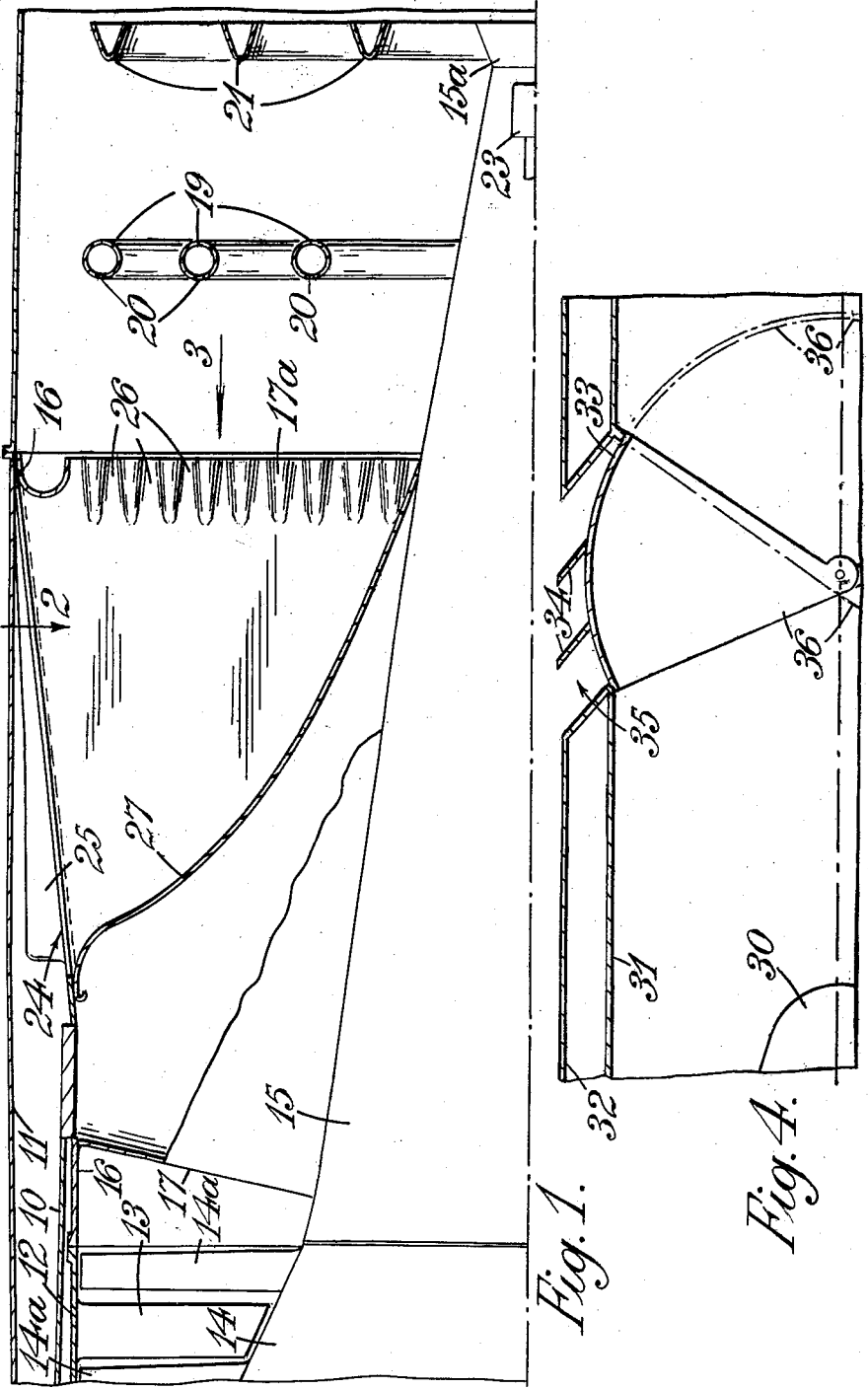

Aug. 13, 1963 G. L. WILDE 3,100,627
BY-PASS GAS-TURBINE ENGINE
Filed March 31, 1958 4 Sheets-Sheet 2
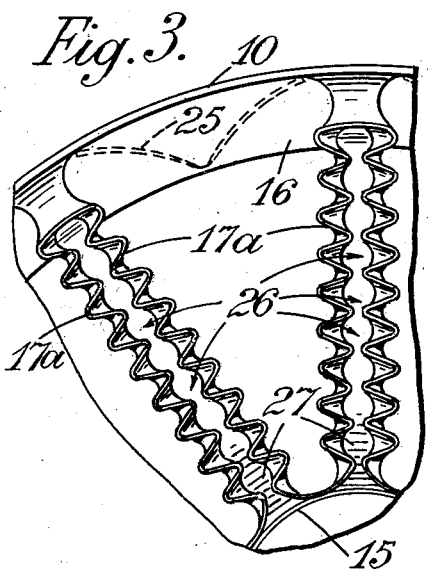
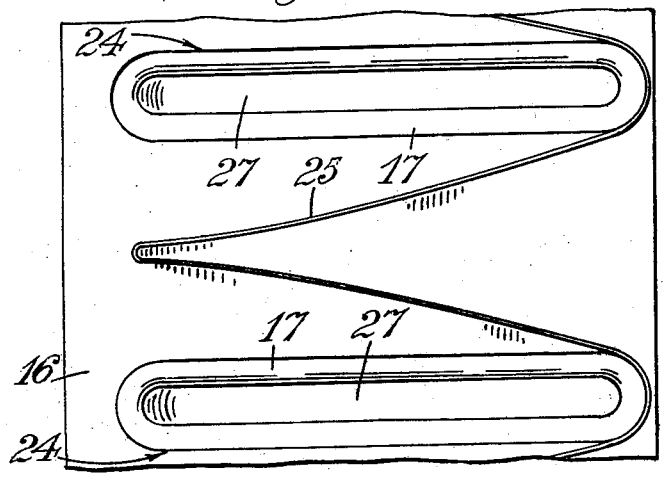

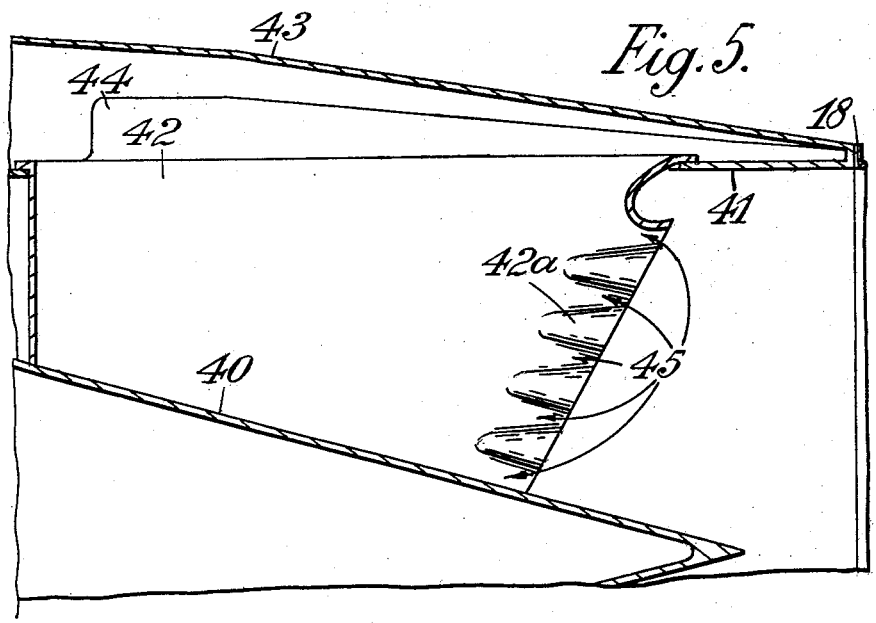
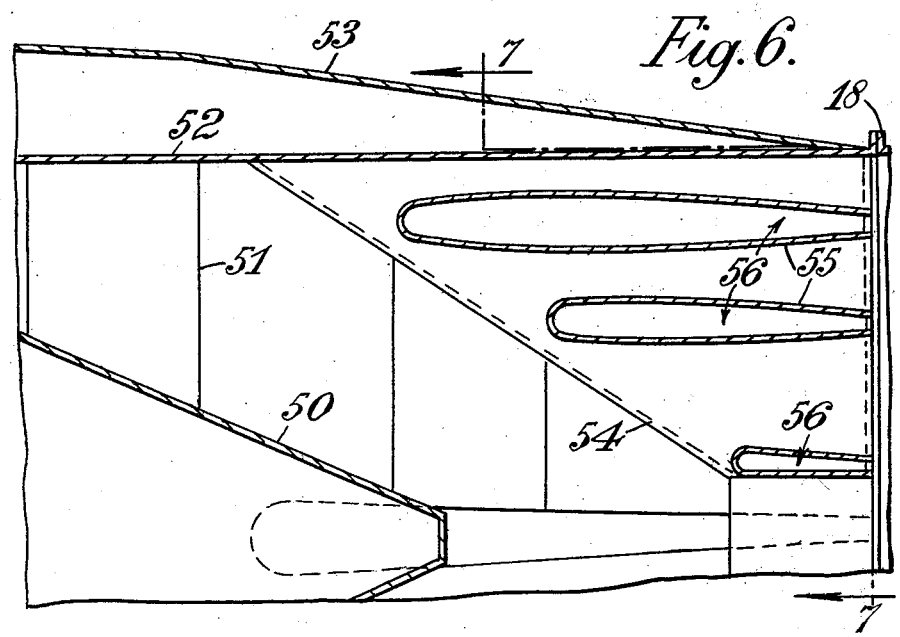

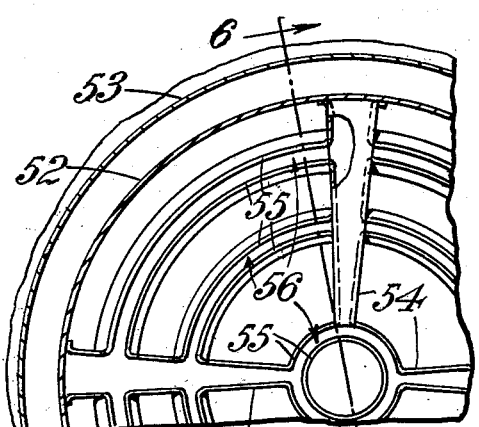
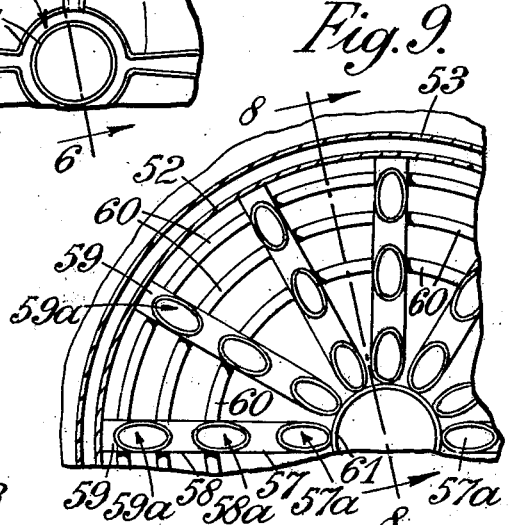
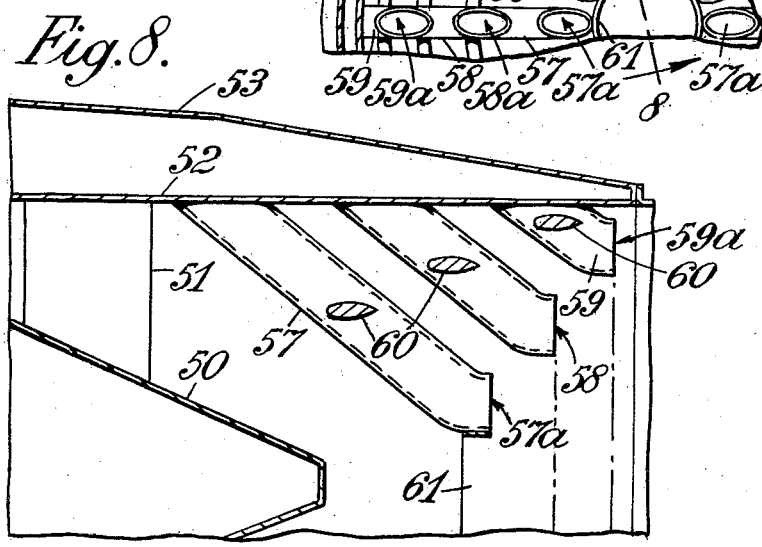

3,100,627
BY-PASS GAS-TURBINE ENGINE
Geoffrey Light Wilde, Shottlegate, England, assignor to Rolls-Royce Limited, Derby, England, a British company
Filed Mar. 31, 1958, Ser. No. 725,326
Claims priority, application Great Britain Apr. 3, 1957
6 Claims. (Cl. 259—4)

This invention comprises improvements in or relating to gas-turbine engines and is concerned more particularly with by-pass gas-turbine engines, that is engines having low-pressure and high-pressure compressor sections, part of the air from the low-pressure section being fed to the high-pressure section and thence through combustion equipment and turbine means to an exhaust assembly including propulsion nozzle means and another part of the air from the low pressure compressor by-passing high-pressure compressor, the combustion equipment and turbine means and being delivered to the propulsion nozzle means.

In accordance with the present invention, a by-pass gas-turbine engine comprises in the exhaust assembly means by which the by-pass air is mixed with the turbine exhaust gases prior to exit from the engine through a common propulsion nozzle, the mixing means including ducts which extend into the exhaust gas passage and have outlets to distribute the air throughout the exhaust gases, whereby improved mixing of the exhaust gas and by-pass air and a substantially uniform temperature distribution at the propulsion nozzle is obtained.

Preferably the outlets from the ducts extend from an annular by-pass air passage surrounding the upstream end of the exhaust assembly substantially across the exhaust gas passage in a radial direction.

In one construction including this preferred feature, the mixing means comprises a series of struts extending from the by-pass air ducting radially inwards across the exhaust gas passage, the struts having outlets along their downstream edges; the downstream edges of the slot in each strut may be corrugated and have the troughs thus formed in their facing surfaces in register, thereby to form in effect a radial series of corrugated nozzles along the downstream edge of the strut. In the case of an engine having reheat combustion equipment (or reversing means or both) the struts will be located upstream of the reheat combustion equipment or the reversing means or both respectively.

In applying the invention to exhaust assemblies including a conical structure on the outlet side of the turbine, which structure is supported by a number of struts from an outer exhaust duct wall, such struts may be made hollow and provide ducts for the introduction of the by-pass air into the exhaust gas. The conical structure and outer exhaust duct wall form an annular exhaust passage which merges to one of circular section at the apex of a cone, and it will be appreciated that where by-pass air is introduced at this location the overall diameter of the jet-pipe downstream thereof may be equal to that of the normal jet-pipe and the by-pass duct which usually surrounds it, without increasing the overall diameter of the exhaust ducting. By this means the mean velocity of the exhaust gases may be reduced.

In another arrangement, the by-pass air flows in an annular passage externally of the upstream end of the exhaust assembly and the mixing means comprises a series of angularly-spaced hollow radial struts communicating at their outer ends with the by-pass air passage and extending inwardly across the exhaust gas passage, and a series of concentric hollow annular delivery members of differing diameters supported by the struts, the delivery members opening into the struts and having outlet slots in their downstream edges.

In yet another arrangement, the by-pass air flows in an annular passage externally of the upstream end of the exhaust assembly and the mixing means comprises a series of angularly-spaced banks of delivery tubes projecting radially into the exhaust gas passage, the delivery tubes communicating at their outer ends with the by-pass air passage and having outlets at their radially inner ends, the tubes in a bank projecting into the exhaust gas passage to different radial extents. For instance each bank of delivery tubes comprises three parallel tubes arranged axially one behind the other, the upstream tube being longest and the downstream tube shortest and the tubes extending inwardly and downstream from their outer ends.

Hitherto in by-pass engines the relatively cooler air bypassing the high-pressure compressor combustion equipment and turbine means is usually directed into a jet pipe carrying the hot turbine exhaust gas. The by-pass air for example enters the exhaust pipe in the form of an annular jet around the circular jet of the turbine exhaust gas, and the two streams flow as one in the jet pipe downstream of the annular jet to be discharged at the end of the pipe through a propulsion nozzle. In such a known arrangement, the mean velocity of the hot gas at the point of introduction of the by-pass air is generally of the order of 1000 ft. per second, and the ratio of the velocity of the by-pass air to that of the exhaust gas is of the order of 1.05 in order to obtain low pressure losses in the exhaust pipe. Theoretically, when a hot gas stream and a cool air stream mix in this way before being discharged through the propulsion nozzle, there is a gain in thrust produced as compared with discharging the by-pass air and turbine exhaust gas from separate propulsion nozzles. The practical gain, however depends upon the degree to which the mixing is effective to obtain a uniform discharge temperature, and also on the magnitude of the pressure loss incurred by mixing the two streams.

Experiments have shown that the known arrangement as described above is comparatively ineffective to obtain the desired degree of mixing within the length of a typical exhaust pipe on an aircraft engine. The present invention therefore provides more effective mixing in the length of jet pipe available by increasing the surface area of contact between the cooler by-pass air and the hotter turbine exhaust gas, and preferably also by arranging for the total pressures in by-pass and exhaust stream to be equal in the mixing plane so that the exhaust gas velocity/by-pass air velocity ratio is increased between the two streams which assists the mixing without appreciably raising the pressure losses in the exhaust pipe.

If the compressor ratio of the L.P. compressor and the compressor ratio of the H.P. compressor are chosen so that the total pressures of the by-pass air and turbine exhaust gas at the mixing plane are substantially equal, then, since static pressures in the mixing planes are substantially equal, the dynamic pressures of the two streams will also be substantially equal. This leads to an exhaust gas velocity/by-pass air velocity ratio between the two streams of the order of 1.4 which larger ratio assists in the mixing process. Further, if the exhaust assembly is dimensioned so that the mean velocity in the jet-pipe is of the order of 500 ft. per second as compared with 1000 ft. per second in hitherto-known arrangements, the exhaust pipe losses will be low. The choice of equal total and static pressures to give efficient mixing is convenient because this leads to the pressure differences on the walls of the mixing device being a minimum, and hence a light structure can be designed.

The arrangement of the invention also has advantages when the exhaust system of the engine is constructed to enable a "reverse thrust" to be obtained, say for aircraft braking purposes, since the construction of the reversing means is simplified as compared with a construction catering for separate exhaust gas and by-pass air flows.

Some construction of by-pass engine exhaust assembly incorporating the invention will now be described with reference to the accompanying drawings in which:

FIGURE 1 is an axial section through part of the engine turbine and one form of exhaust assembly;

FIGURE 2 is a view in the direction of arrow 2 on FIGURE 1 with a part of the assembly removed;

FIGURE 3 is a view in the direction of arrow 3 on FIGURE 1;

FIGURE 4 illustrates a form of reversing means which may be used in association with the exhaust assembly downstream of the structure of FIGURES 1 to 3;

FIGURE 5 illustrates a modification of the arrangement shown in FIGURES 1 to 3;

FIGURE 6 illustrates another construction of exhaust assembly;

FIGURE 7 is a section on the line 7—7 of FIGURE 6 the plane of section of which is indicated at 6—6, and FIGURES 8 and 9 are corresponding views of yet another construction of exhaust assembly, FIGURE 8 being a section on the line 8—8 of FIGURE 9.

A by-pass gas turbine engine, part only of which is shown, comprises a low-pressure compressor, a high-pressure compressor, combustion equipment, a turbine section and an exhaust assembly connected in flow series. Also part of the air from the low-pressure compressor is lead directly from its outlet into the exhaust assembly thus by-passing the high-pressure compressor, combustion equipment and turbine section.

The by-pass duct comprises a cylindrical inner wall 10 (FIGURES 1 to 3) and an outer wall 11, and the engine turbine comprises a casing 12 carrying stator vanes 13, and a turbine rotor 14 comprising rotor blades 14a.

The exhaust assembly comprises a central bullet 15 connected to an outer exhaust duct wall 16 by hollow struts 17. The outer duct wall 16 is frusto-conical and has its large diameter end downstream.

It is arranged that the walls 11, 16 meet at their downstream ends. The exhaust assembly also comprises a jet pipe 18 which extends to a propulsion nozzle (not shown) which may be of the fixed or variable-area kind, may be a convergent nozzle or a convergent/divergent nozzle, and may be a "silenced" nozzle. There may also be provided thrust reversing means, such as for example as shown in FIGURE 4.

In the construction of exhaust assembly shown, in FIGURE 1, the jet pipe 18 houses reheat combustion equipment which comprises fuel injectors 19 in the form of tubular rings with outlet orifices 20 therein, combustion stabilising gutter members 21 substantially axially aligned with and downstream of the injectors 19, and a pilot injector 23 contained in the downstream end of the bullet 15 which is flared at 15a to provide a flame stabilizing baffle.

In accordance with the present invention, it is arranged by suitably selecting the compressor ratios of the low-pressure and high-pressure compressors and the dimensions of the various parts of the engine that the by-pass air is delivered into the exhaust duct with a comparatively low velocity and at a pressure which is substantially equal to that of the exhaust gases from the turbine.

Also, the by-pass air is distributed throughout the exhaust duct, for example, in the following way. The hollow struts 17 have their interiors communicating with the by-pass air passage by means of slots 24 provided in the wall 16 and a zig-zag wall 25 is fitted between the walls 16, 11 to guide the air towards the slots 24. Zig-zag wall 25 may also be a structure member to carry the thrust reverser or reheat pipe from the engine.

The downstream edge of each strut 17 is formed in effect with a radial series of outlet ducts 26, terminating in corrugated nozzles 17a. These are formed in extensions of the side walls of the struts 17, the troughs in the facing surfaces of the wall portions 17a registering with one another. A curved strip of metal 27 is fitted in each strut 17 to extend from the radially inner end of each series of nozzles 26 to adjacent the upstream end of each slot 24 to assist to guide the by-pass air towards the nozzles 26.

The air/exhaust gas mixing arrangement above described may also be used in exhaust assemblies comprising thrust reversing means, whether fitted with reheat combustion equipment or not. One form of such reversing means is shown in FIGURE 4 in which the central bullet is indicated at 30 and the jet pipe at 31. The whole is enclosed in a fairing 32 (not shown in FIG. 1).

Porting 33 is formed in the jet pipe 31 leading to passages formed between vanes 34, these passages opening to atmosphere through porting 35 in the fairing 32. Valve members 36 are provided to swing between a position indicated in full lines in which they close off the porting 33 and the exhaust gases flow rearwardly to atmosphere, and a position (chain lines) in which the valve members 36 block off the rearward flow and constrain the gases to flow to atmosphere through the porting 35 with a component of velocity in the forward direction.

In FIGURE 5, there is shown a modified form of the exhaust assembly illustrated in FIGURES 1 to 3. The exhaust cone is indicated at 40 and it is supported from an exhaust duct outer wall 41 by hollow struts 42 which communicate by their outer ends with the by-pass air passage formed between wall 41 and an encircling wall 43. A zig-zag wall 44 (corresponding to wall 25 of FIGURES 1 to 3) is provided to assist in causing the air to flow into the struts 42.

The downstream ends 42a of the struts 42 are corrugated to form nozzle-like outlets 45 as in the construction of FIGURES 1 to 3, but in this construction the downstream edges of the struts 42 are inclined to the radial direction, the inner ends of the edge being upstream of their outer ends. This arrangement enables dimensions of the exhaust assembly, for instance of the cone 40 to be reduced.

In the exhaust assembly of FIGURES 6 and 7, the exhaust cone 50 is supported by struts 51 from outer exhaust duct wall 52 and the by-pass air passage is formed between wall 52 and a further wall 53. The by-pass air flows from between walls 52, 53 into a series of angularly spaced hollow radial struts 54 which increase in radial depth in the downstream direction and are closed at their downstream ends, and the air is distributed by the struts 54 into concentric hollow annular delivery members 55 of differing diameters supported by the struts 54. The by-pass air leaves the members 55 through slots 56 in their downstream ends. The members 55 are of streamlined axial section.

The form of exhaust assembly shown in FIGURES 8 and 9 comprises parts 50, 51, 52, 53 as in FIGURES 6 and 7. The by-pass air is delivered from the by-pass air passage into the exhaust gas passage by a series of angularly spaced banks of delivery tubes of elliptical cross-section. In the arrangement shown, each bank comprises three tubes 57, 58, 59 arranged axially one behind the other in the direction of gas flow, the tubes being parallel and extending inwardly and downstream from their points of connection to wall 52 and the upstream tube 57 being longer than tube 58 and tube 58 being longer than tube 59 so that their outlets 57a, 58a, 59a are at different radial distances from the axis of the exhaust assembly. The assembly of tubes 57, 58, 59 is stiffened by arcuate ties 60 extending between them, the ties being of streamline cross-section. The inner ends of tubes 57 are secured to a ring 61.

In each of the arrangements of FIGURES 5 to 9 the desired ratio of by-pass air velocity to exhaust gas velocity is obtained by suitably dimensioning the means by which the by-pass air is fed into the exhaust assembly.

I claim:

1. Apparatus to admix compressed air with exhaust gases comprising a tubular wall defining a duct having an upstream end disposed to receive the exhaust gases, a series of angularly-spaced hollow struts projecting radially inwards from the tubular wall into the said duct, the hollow spaces of said struts being opened at their radially outer ends to receive said compressed air and having at least at their inner ends outlets opening into the said duct so that the compressed air flowing into the hollow struts is delivered into said duct and mixed with the exhaust gases passing through the same, each strut comprising a bank of axially spaced delivery tubes, projecting radially into the duct, each said tube having a radially outer end and a radially inner end, the delivery tubes receiving at their radially outer ends said compressed air and having outlets at their radially inner ends, the tubes in the bank projecting into the duct to different radial extents.

2. Apparatus according to claim 1 wherein each bank of delivery tubes comprises three parallel tubes arranged axially one behind the other, the upstream tube being longest and the downstream tube shortest and the tubes extending inwardly and downstream from their outer ends.

3. Apparatus to admix compressed air with exhaust gases comprising a tubular wall defining a duct having an upstream end disposed to receive the exhaust gases, a series of angularly-spaced hollow struts projecting radially inwards from the tubular wall into the said duct, the hollow spaces of said struts being open at their radially outer ends to receive said compressed air and having at least at their inner ends outlets opening into the said duct so that the compressed air flowing into the hollow struts is delivered into said duct and mixed with the exhaust gases passing through the same, said struts having side walls and said outlets being slots formed between the downstream edges of the side walls and extending radially to the inner ends thereof, and said side walls of each strut being corrugated at their downstream edges and having the troughs thus formed in their facing surfaces in register, thereby to form in effect a radial series of corrugated nozzles along the downstream edge of each strut.

4. Apparatus to admix compressed air with exhaust gases comprising a tubular wall defining a duct having an upstream end disposed to receive exhaust gases, a series of angularly-spaced hollow struts projecting radially inwards from the tubular wall into the said duct, the hollow spaces of said struts being open at their radially outer ends to receive said compressed air and having at least at their inner ends outlets opening into the said duct so that the compressed air flowing into the hollow struts is delivered into said duct and mixed with the exhaust gases passing through the same and a conical structure located coaxially within the tubular wall forming an annular exhaust passage, the struts supporting the conical structure from the tubular wall.

5. Apparatus to admix compressed air with exhaust gases comprising a tubular wall defining a duct having an upstream end disposed to receive the exhaust gases, a series of angularly-spaced hollow struts projecting radially inwards from the tubular wall into the said duct, the hollow spaces of said struts being open at their radially outer ends to receive said compressed air and having at least at their inner ends outlets opening into the said duct so that the compressed air flowing into the hollow struts is delivered into said duct and mixed with the exhaust gases passing through the same, said outlets from the struts comprising a series of concentric hollow annular delivery members of differing diameters supported by the struts, the delivery members opening into the struts and having circumferential outlet slots in their downstream edges.

6. Apparatus according to claim 3 wherein the downstream edge of each side wall of each strut is inclined to the radial direction, the outer end of each edge being axially downstream of the inner end.

References Cited in the file of this patent

UNITED STATES PATENTS

| | | |
|---|---|---|
| 2,088,591 | Ferkel | Aug. 3, 1937 |
| 2,297,910 | Neuland | Oct. 6, 1942 |
| 2,308,059 | Decker | Jan. 12, 1943 |
| 2,358,690 | Decker | Sept. 17, 1944 |
| 2,421,518 | Molloy | June 3, 1947 |
| 2,426,833 | Lloyd | Sept. 2, 1947 |
| 2,465,099 | Johnson | Mar. 22, 1949 |
| 2,488,783 | Stalker | Nov. 22, 1949 |
| 2,588,532 | Johnson | Mar. 11, 1952 |
| 2,600,733 | Clift | June 17, 1952 |
| 2,620,622 | Lundberg | Dec. 9, 1952 |
| 2,647,369 | Leduc | Apr. 4, 1953 |
| 2,650,073 | Holm | Aug. 25, 1953 |
| 2,653,446 | Price | Sept. 29, 1953 |
| 2,825,204 | Kadosch et al. | Mar. 4, 1958 |
| 2,852,233 | Hryniszak | Sept. 16, 1958 |

FOREIGN PATENTS

| | | |
|---|---|---|
| 749,009 | Great Britain | May 16, 1956 |